(12) United States Patent
Kaura (10) Patent No.: US 6,783,021 B2
(45) Date of Patent: Aug. 31, 2004

(54) CANISTER WITH AIR-TIGHT LID AND SPRING CAMPING HANDLE

(76) Inventor: Kamaljit S. Kaura, 22991 La Cadena Dr., Laguna Hills, CA (US) 92653-1314

(*) Notice: Subject to any disclaimer, the term of this patent is extended or adjusted under 35 U.S.C. 154(b) by 0 days.

(21) Appl. No.: 10/061,382

(22) Filed: Feb. 1, 2002

(65) Prior Publication Data

US 2003/0146220 A1 Aug. 7, 2003

(51) Int. Cl.$^7$ .............................................. B65D 25/00
(52) U.S. Cl. ...................... 220/482; 220/802; 220/773; 119/475; 119/521; 119/515
(58) Field of Search ................................ 220/482, 786, 220/773, 801, 475, 476, 789, 790, 802, 751, 771, 769; 248/690, 318, 213.2, 215, 311.2, 312, 312.1; 119/464, 475, 61, 477, 521, 575

(56) References Cited

U.S. PATENT DOCUMENTS

| | | | | |
|---|---|---|---|---|
| 1,567,618 A | * | 12/1925 | Robinson | 220/751 |
| 1,762,589 A | * | 6/1930 | Rivers | 119/61 |
| 1,888,127 A | * | 11/1932 | Hearne | 220/482 X |
| 3,329,321 A | * | 7/1967 | Moore | 220/751 |
| 4,004,710 A | * | 1/1977 | Crisci | 220/780 |
| 4,011,951 A | * | 3/1977 | Boyer | 248/311.2 |
| 4,148,699 A | * | 4/1979 | Mayer et al. | 148/243 |
| 4,380,304 A | * | 4/1983 | Anderson | 220/790 |
| 4,825,590 A | * | 5/1989 | Cullinane | 248/311.2 |
| 4,995,337 A | * | 2/1991 | Abrams et al. | 119/477 |
| 5,064,090 A | * | 11/1991 | Farrier | 220/482 |
| 5,148,755 A | * | 9/1992 | Morales | 248/311.2 |
| 5,457,850 A | * | 10/1995 | Knox | 220/773 X |
| 5,624,095 A | * | 4/1997 | Zissu | 248/316.7 |
| 5,875,913 A | * | 3/1999 | Letica | 220/780 X |
| 6,015,061 A | * | 1/2000 | Lowry | 220/796 X |
| 6,073,899 A | * | 6/2000 | Omrani | 248/316.7 |
| 6,189,489 B1 | * | 2/2001 | Pearce | 119/477 |
| 6,260,663 B1 | * | 7/2001 | Combs | 248/210 |

* cited by examiner

*Primary Examiner*—Nathan J. Newhouse
(74) *Attorney, Agent, or Firm*—Gene Scott-Patent Law & Venture Group (57) ABSTRACT

An animal feed apparatus comprises in combination, a circular container having a peripheral sidewall closed by a bottom panel, and at a top end outwardly extending with an integral lip. An interior surface of the sidewall is formed with an inwardly directed slope, and a lid provides an annular lip having a pair of annular, outwardly facing and outwardly extending, spaced apart ribs positioned for intimate frictional contact with the sloped sidewall of the container and adapted for vacuum engagement with the container so as to seal an interior space of the container.

1 Claim, 9 Drawing Sheets

CANISTER WITH AIR-TIGHT LID AND SPRING CAMPING HANDLE

BACKGROUND OF THE INVENTION

FIELD OF THE INVENTION

This invention relates generally to containers and more particularly to a bucket style container with a tight fitting cover and a means for attachment to a retaining fence. The prior art teaches hand buckets for use in carrying liquid and solid products of all types, but does not teach a bucket with a means for easily clasping onto a fence rail with spring force, for attachment to the rail with a fastener and with an air-tight lid. The present invention fulfills these needs and provides further related advantages as described in the following summary.

SUMMARY OF THE INVENTION

The present invention teaches certain benefits in construction and use which give rise to the objectives described below.

An animal feed apparatus comprises in combination, a circular container having a peripheral sidewall closed by a bottom panel, and at a top end outwardly extending with an integral lip. An interior surface of the sidewall is formed with an inwardly directed slope, and a lid provides an annular lip having a pair of annular, outwardly facing and outwardly extending, spaced apart ribs positioned for intimate frictional contact with the sloped sidewall of the container and adapted for vacuum engagement with the container so as to seal an interior space of the container.

A primary objective of the present invention is to provide an apparatus and method of use of such apparatus that provides advantages not taught by the prior art.

Another objective is to provide such an invention capable of storing animal feed and other organic products sealed from moisture and air.

A further objective is to provide such an invention capable of being easily attached to a retaining fence so as to be available to animals for feeding without the possibility of being easily overturned or spilling contents.

A still further objective is to provide such an invention capable of avoiding microorganism infestation on interior surfaces.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

The present invention is an animal feed apparatus comprising in combination, a circular container 10 of molded plastic construction, preferably a combination of copolymers including polypropylene, having a peripheral sidewall 20 closed by a bottom panel 30, and at a top end 40 having an outwardly extending integral annular lip 50. Please refer to the figures to comprehend the structure and conformance of the invention. An interior surface 60 of the sidewall 20 is formed with an inwardly directed slope as can be seen from the exterior views in FIGS. 1–5 and 8–12. This allows contents to be more easily emptied. A lid 70 provides an annular lid lip 80 having a pair of annular, outwardly facing and outwardly extending, spaced apart ribs 90, as best seen in FIG. 10, positioned for intimate frictional contact with the sloped interior surface 60 of the container 10 and adapted for vacuum engagement with the container 10 so as to seal an interior space 110 of the container 10. A very slight vacuum is produced within the container 10 when the lid 70 is pressed into the top end 40 because of the interaction between the sloped interior surface 60 of the container 10 and the pair of ribs 90 on the lid 70. Because of this the container 10 is able to be supported solely by the lid 70, with vacuum within the container 10 preventing separation.

Figure 1:
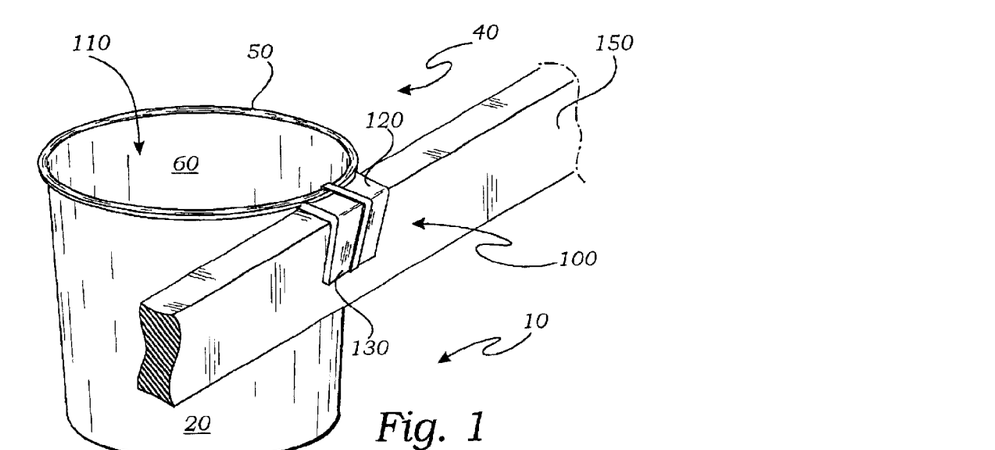
FIGS. 1 and 2 are perspective views of a preferred embodiment of the invention as mounted to a fence rail.
Figure 2:
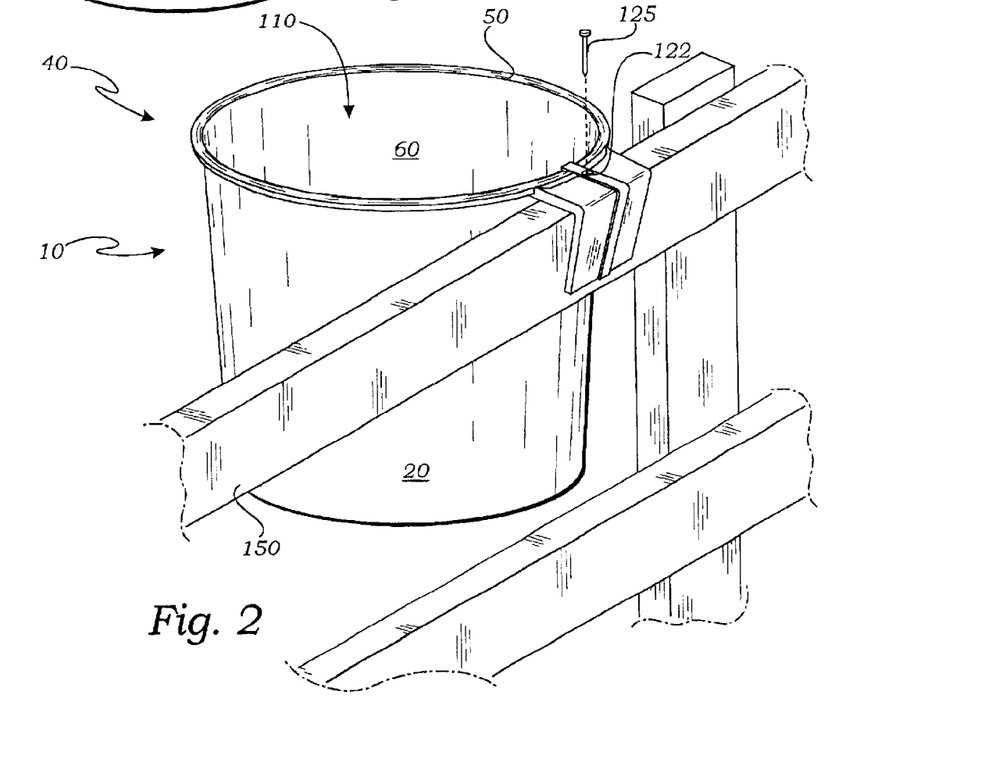
Figure 3:
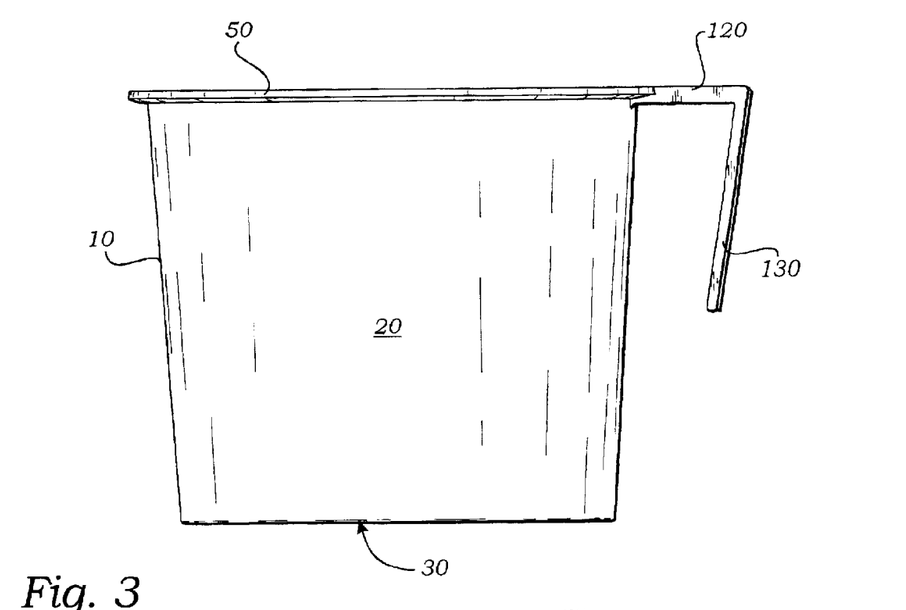
FIG. 3 is a side elevational view thereof.
Figure 4:
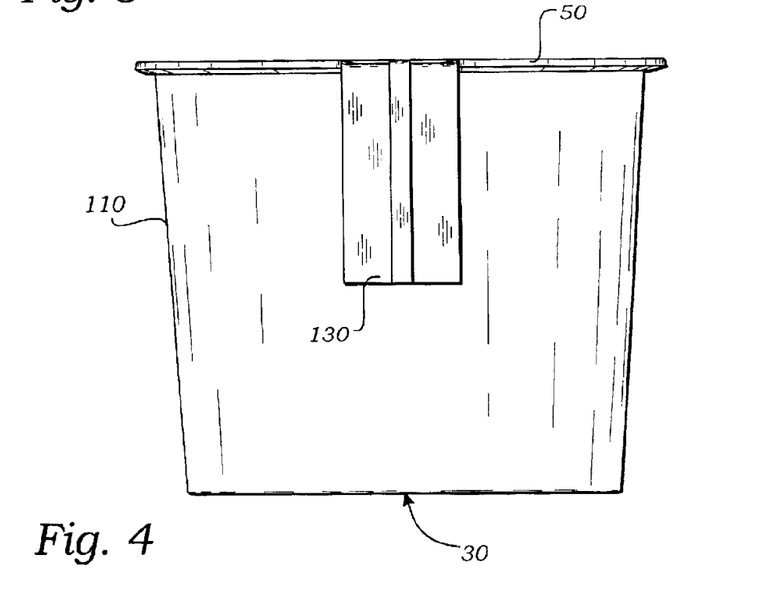
FIG. 4 is a front elevational view thereof.
Figure 5:
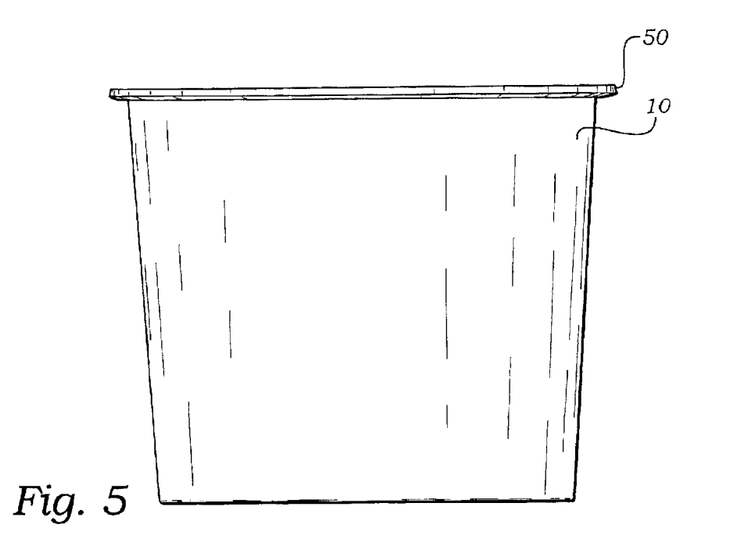
FIG. 5 is a rear elevational view thereof.
Figure 6:
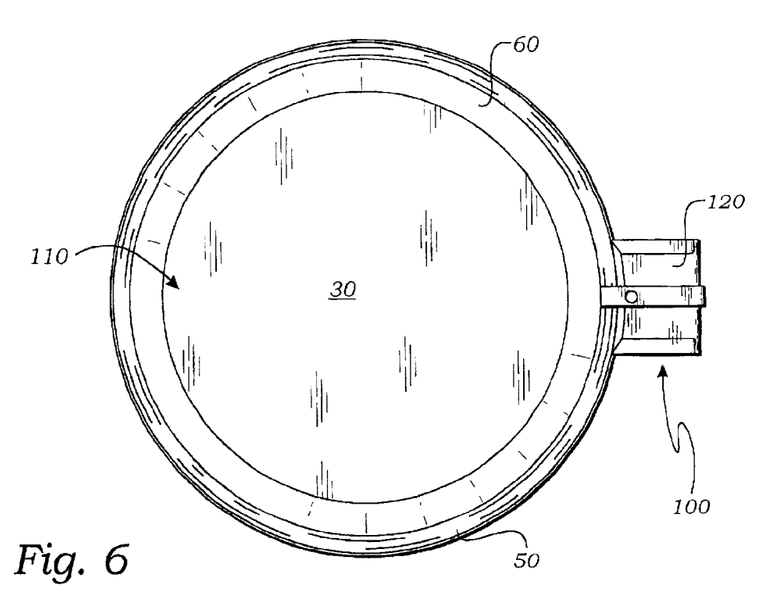
FIG. 6 is a top plan view thereof.
Figure 7:
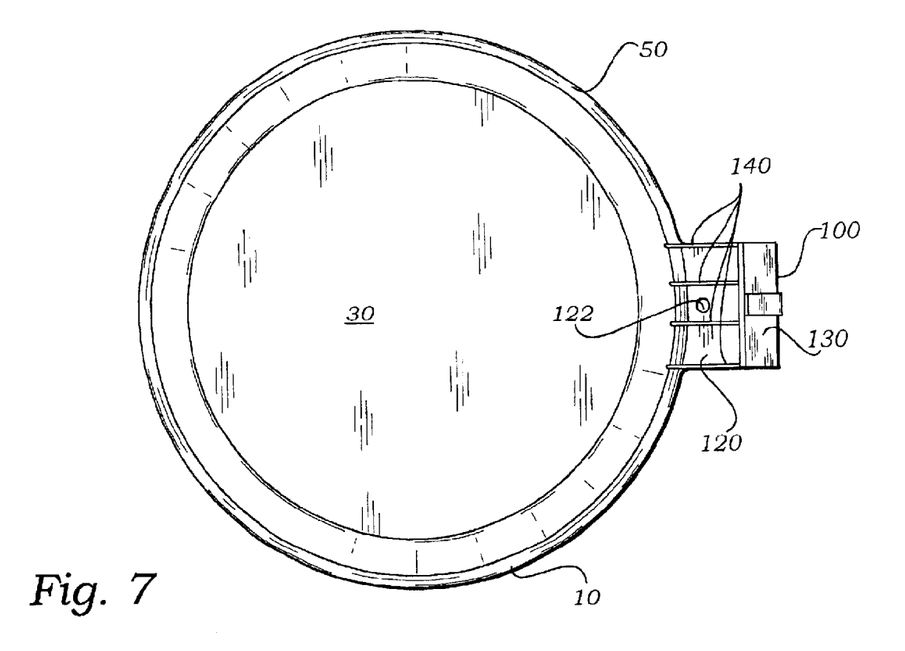
FIG. 7 is a bottom plan view thereof.

Preferably, in a first embodiment, a side handle 100 includes an outwardly extending portion 120 integral with the lip 50 of the container 10 and a downwardly extending portion 130 spaced apart from the peripheral sidewall 20. Preferably, the side handle 100 provides plural stiffening ribs 140 as may be seen in FIG. 7. The side handle 100 is preferably adapted for receiving a fence rail 150 frictionally sandwiched between the downwardly extending portion 130 and the container sidewall 20 and wherein the outwardly extending portion 120 includes a fastening aperture 122 adapted for receiving a fastener 125 such as a nail, for securement of the handle 100 to the fence rail 150. It may be noticed that the downwardly extending portion is directed at an angle toward the sidewall 20 so that when the handle 100 is forced over the rail 150 the outwardly extending portion 120 flexes to cause a spring clamping action for holding the container 10 in place on the rail 150.7

Preferably, the interior surface has a mirror finish adapted for inhibiting the lodging of microorganisms. This finish is produced by highly polishing the interior of the injection mold within which the part is produced.

Figure 8:
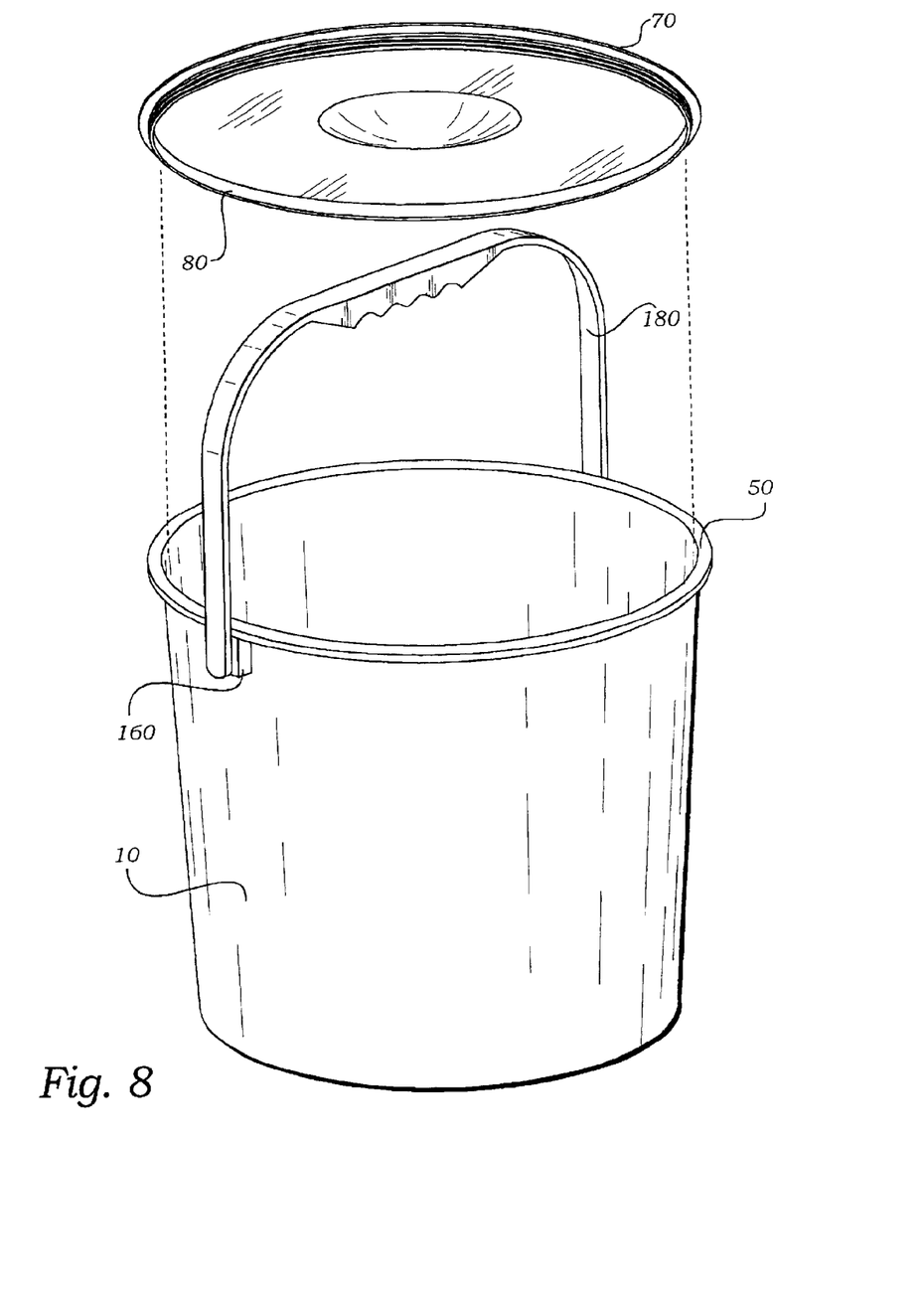
FIGS. 8 and 9 are perspective views of a further embodiment of the invention.
Figure 9:
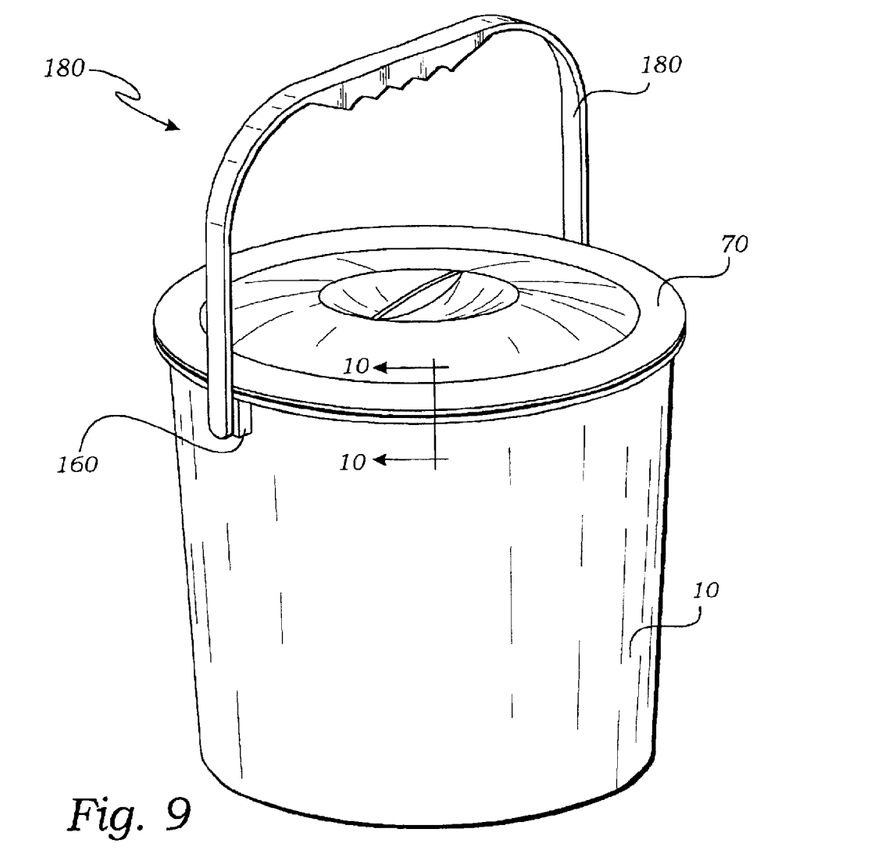
Figure 10:
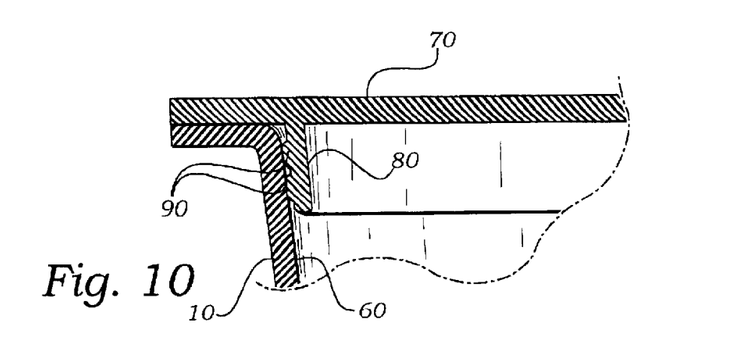
FIG. 10 is a partial section view taken along line 10—10 in FIG. 9.
Figure 11:
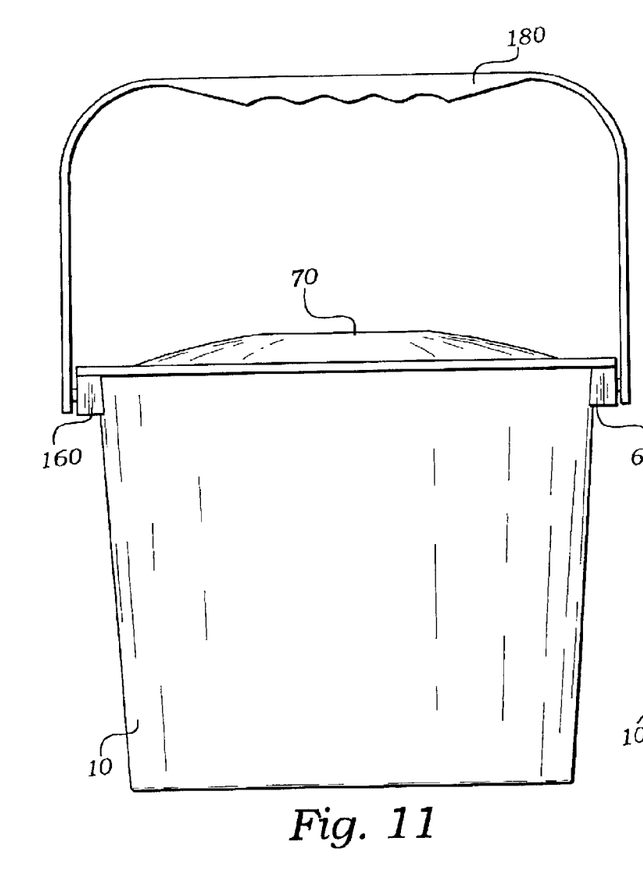
FIGS. 11 and 12 are side elevational views thereof.
Figure 12:
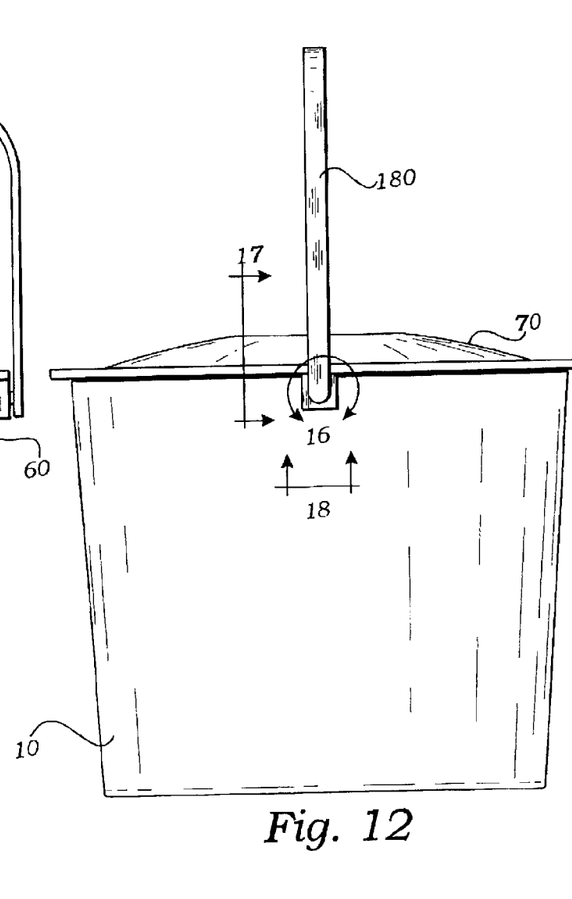
Figure 13:
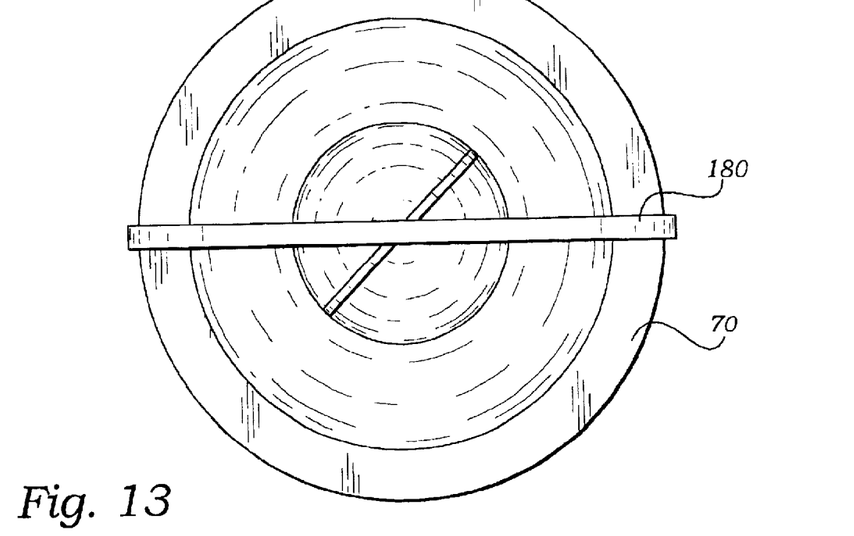
FIGS. 13 and 14 are top plan view thereof with and without a cover element of the invention.
Figure 14:
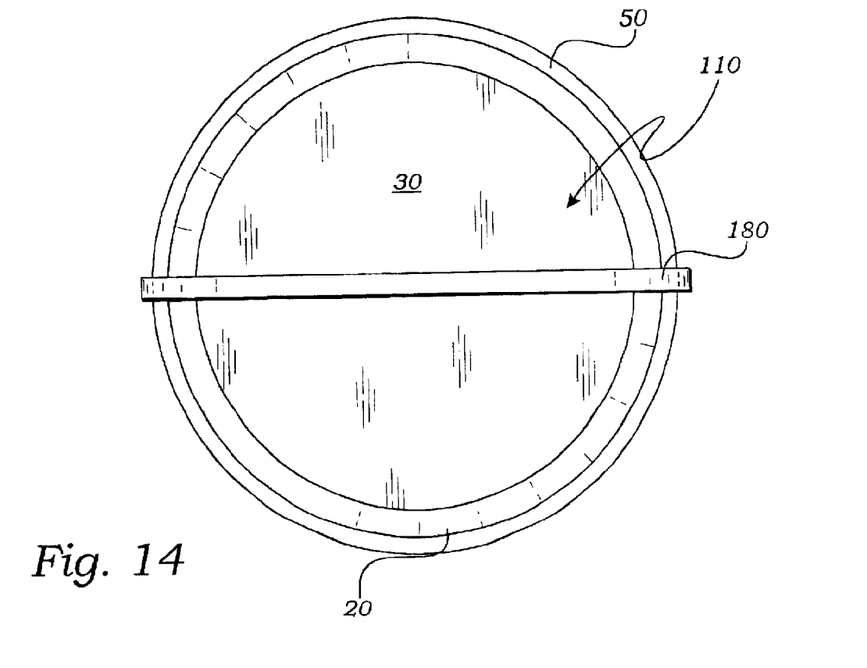
Figure 15:
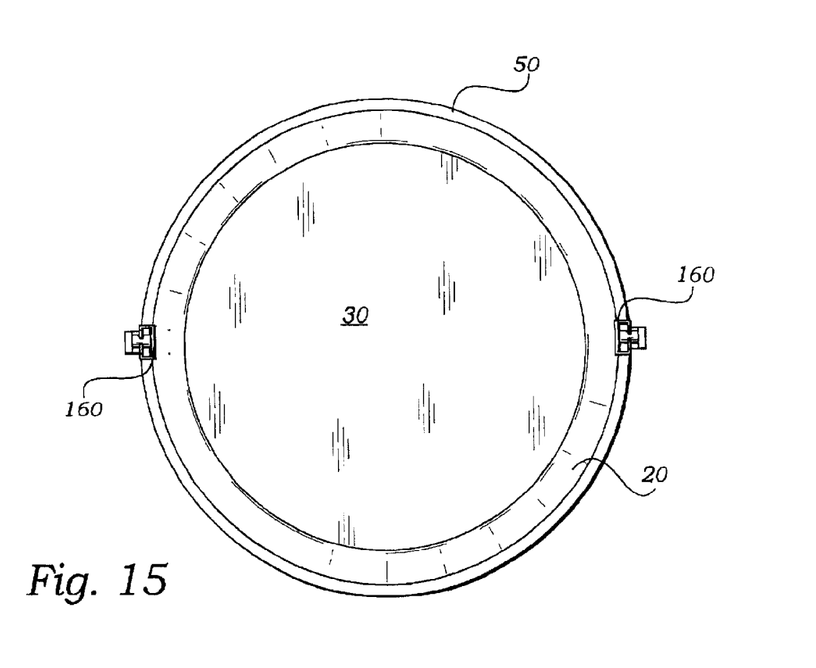
FIG. 15 is a bottom plan view thereof.
Figure 16:
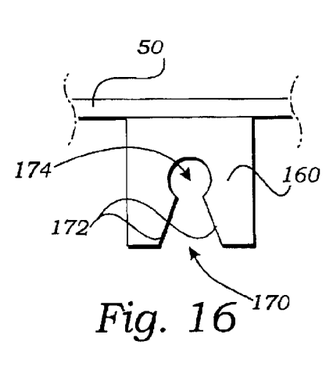
FIG. 16 is a partial cutout view taken at line 16 in FIG. 12.

In an alternate embodiment, shown in FIGS. 8 and 9, a pair of handle receivers 160 are placed in opposing positions and integral with the lip of the container as best seen in FIG. 15. These receivers 160 are each downwardly extending and form a downwardly directed, keyhole shaped receiving slot 170 comprised of a divergent section 172 and a receiving hole 174 which is open to the divergent section 172.

Figure 17:
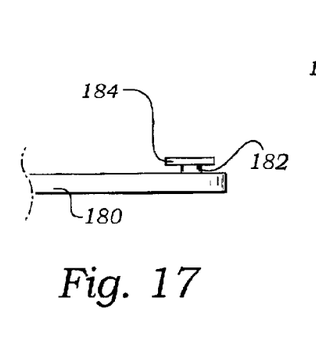
FIG. 17 is a partial side view of a handle of the invention taken at line 17 in FIG. 12.
Figure 18:
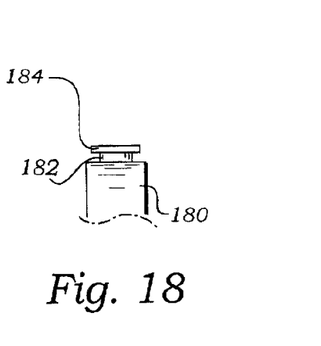
FIG. 18 is an end view of the handle taken at line 18 in FIG. 12.

A U-shaped strap handle 180 may alternately be used with the present invention. This handle 180 preferably provides, at each end, a shaft 182 adapted for engaging the receiving slot 170, the shaft terminating with a restraining flange 184. It should be noticed that the shaft 182 is wider in FIG. 18 and narrower in FIG. 17. Thus, the shaft 182 is able to be easily engaged or disengaged with hole 174 when the handle 180 is aligned with the lip 50, i.e, in the rotated to one side position, but when it is rotated into the upright position shown in FIG. 9, the shaft 182 is not able to be disengaged easily from hole 174. This provides an added locking feature when the container 10 is being carried. Thus, we see that the shafts 182 are asymmetrical such that they are engagable with the receiving slots 170 when the handle is positioned adjacent to the lip of the container, the shafts being thereafter not easily disengagable from the receiving slots when the handle is rotated to a position aligned axially with the container.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An animal feed apparatus comprising in combination: a circular container having a peripheral sidewall closed by a bottom panel, and at a top end thereof an outwardly extending integral lip; an interior surface of the sidewall formed with an inwardly directed slope, and a planar lid having only an annular lid lip having a pair of annular ribs positioned for such intimate frictional contact with the sloped sidewall of the container as to cause a vacuum engagement therewith to seal the container, the apparatus further comprising a side handle including an outwardly extending portion integral with the lip of the container and a downwardly extending portion spaced apart from the peripheral sidewall, the downwardly extending portion directed at an angle toward the sidewall and flexible for causing a spring clamping action for holding the container in place on a rail the side handle having plural stiffening ribs; the side handle adapted for receiviing a fence rail frictionally sandwiched between the downwardly extending portion and the container sidewall and wherein the outwardly extending portion including a fastening aperture adapted for receiving a fastener for securement of the handle to the fence rail.

\* \* \* \* \*